Aug. 24, 1965 D. EKLÖV 3,202,938

SELF-BLOCKING MULTIVIBRATOR

Filed May 12, 1961

INVENTOR
DAVID EKLÖV

BY Strauch, Nolan & Neale
ATTORNEYS 3,202,938
SELF-BLOCKING MULTIVIBRATOR
David Eklöv, Alvsjo, Sweden, assignor to Svenska Relafabriken A.B.N. Aktiebolag, Tyreso, Sweden, a joint-stock company of Sweden
Filed May 12, 1961, Ser. No. 109,733
4 Claims. (Cl. 331—113)

The present invention relates to a device for generating repeated trains of electric pulses or waves, and more specifically is directed to a novel self-blocking multivibrator circuit.

A circuit of this type can be used for instance for producing an acoustic indication in the form of audio frequency signals repeated at regular intervals. Thus the signal generator according to the invention can be used in a loudspeaking telephone apparatus for indicating that the telephone apparatus is in operative condition. The generator may be combined with the speech amplifier of the telephone apparatus and is started when the telephone apparatus is called or when a call is initiated from the apparatus. For this purpose the frequency of the oscillations in each wave train may be for instance 1000 cycles per second, the duration of each wave train for instance 50 milliseconds, and the intervals between the wave trains 10 to 15 seconds. However, the signal generator in accordance with the invention is also applicable for other purposes.

The principal object of the present invention is to provide a novel signal generator which comprises a self-blocking non-stable multivibrator circuit having two amplifying elements operating in push-pull, for instance electron tubes or transistors, and a direct current source for supplying the required operating power to the generator. According to the invention the control electrodes of the amplifying elements of the multivibrator circuit are connected to a common point over circuits which each comprise a resistor and an asymmetric circuit element connected in parallel with the resistor, and the said common point is connected through a capacitor to one pole of the direct current source.

A further and more detailed object of the invention is to provide a novel multivibrator circuit that is connected to an amplifier over which the generated wave trains are derived from the multivibrator circuit, and this amplifier can be so designed that it acts as a gate and passes only a part of each wave train.

Figure 1:
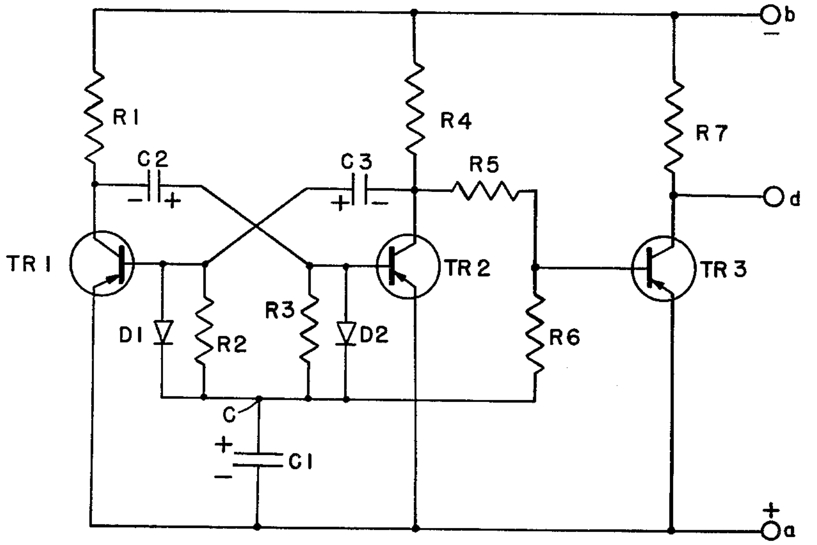
Figure 2:
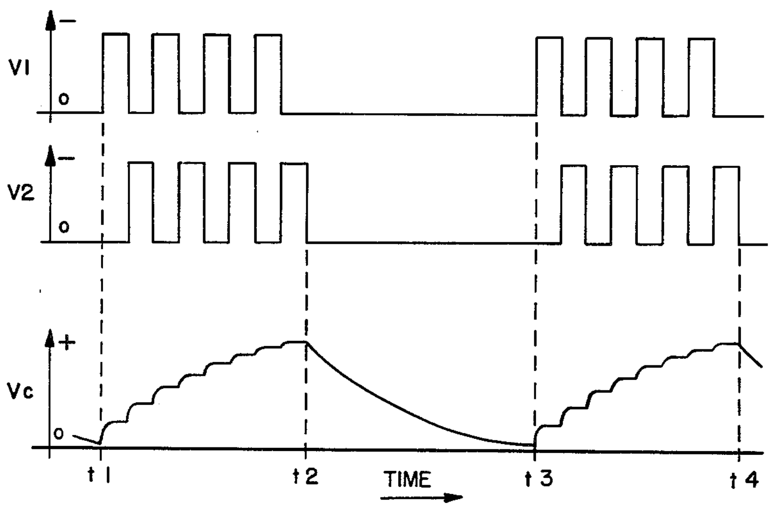

Other objects of the invention will become more fully apparent from the claims, and from the description as it proceeds in conjunction with the accompanying drawings wherein:

FIGURE 1 is a circuit diagram of a preferred embodiment of the present invention; and FIGURE 2 shows various voltage wave forms illustrating the operation of the circuit of FIGURE 1.

The transistors TR1 and TR2 and the circuits associated therewith form a multivibrator circuit. This obtains direct current from a direct current source (not shown) which is connected to terminals *a* and *b*, *b* being negative with respect to *a*.

The transistor TR3 forms an amplifier for the output from the multivibrator and is connected to the multivibrator in such manner that it also acts as a gate as will be described in the following. The output voltage from the amplifying transistor TR3 is derived from terminals *d* and *a*.

In FIGURE 1 resistors are designated R accompanied by a numeral, and the capacitors are designated C accompanied by a numeral. The multivibrator circuit also includes two asymmetric circuit elements designated D1 and D2. These preferably consist of rectifier diodes.

As appears from FIGURE 1 each of the diodes D1 and D2 is connected in parallel with a resistor R2 and R3 respectively. The parallel circuits so formed are connected between the base of transistor TR1 and transistor TR2 respectively and a common point *c*. The forward direction of diodes D1 and D2 is from the base of the respective transistor TR1 and TR2 to the common point *c*. A capacitor C1 is connected between point *c* and one pole *a* of a direct current source, and the two transistors TR1 and TR2 obtain base voltage over this capacitor.

The other components of the multivibrator circuit, the resistors R1 and R4 and capacitors C2 and C3 are connected in conventional manner to the transistors TR1 and TR2 so that a symmetrical circuit is obtained.

In practice it is not possible to make the multivibrator circuit perfectly symmetric and nor is this desirable, since the lacking symmetry and the circuit noise make the multivibrator self-starting.

When the multivibrator oscillates, the transistors TR1 and TR2 become alternately blocked and conductive. The transistors operate essentially as switches which are alternately closed and opened, and therefore the power consumption of the multivibrator becomes very small.

In FIGURE 2, graphs V1 and V2 show the variations in the collector voltage for transistors at TR1 and TR2 respectively, and the graph V*c* shows the variations in the voltage across capacitor C1. The reference (0) level in all the graphs is the potential of terminal *a* of the power supply. In the embodiment illustrated in FIGURE 1, the collector voltage of transistor TR2, i.e. the voltage shown in graph V2 in FIGURE 2, is taken as the output from the multivibrator.

The capacitors C2 and C3 are alternately charged and discharged when the multivibrator oscillates i.e. during the time intervals $t1$–$t2$ and $t3$–$t4$ as indicated in FIGURE 2. Capacitor C2 is charged over resistor R1 and the base-emitter path of transistor TR2, when this transistor is conductive and transistor TR1 is blocked. When the conditions of the transistors are then reversed, so that TR1 becomes conductive and TR2 blocked, that terminal of capacitor C2 which is connected to the collector of transistor TR1, will be at practically the same potential as terminal *a*, since the voltage drop across the collector-emitter path of transistor TR1 is very small when the transistor is in conductive state. Capacitor C2 is now discharged over diode D2 to capacitor C1. In an analogous manner capacitor C3 is charged over resistor R4 and the base-emitter path of transistor TR1 and is discharged over diode D1 and the collector-emitter path of transistor TR2 to capacitor C1.

Thus, a certain amount of charge is added to capacitor C1 during each half cycle of the oscillations of the multivibrator, and hereby the voltage across capacitor C1 is increased and point *c* becomes more and more positive in relation to point *a* as shown in graph V*c* of FIGURE 2. This means that the biasses on the base electrodes of transistors TR1 and TR2 are changed in positive sense, and when the voltage across C1 has increased so that it is practically equal to the voltage between *a* and *b*, which occurs at the time $t2$ and $t4$ in FIGURE 2, the two transistors TR1 and TR2 will be blocked, and the multivibrator ceases to oscillate. Capacitor C1 is then discharged by leakage current through the transistors and resistors R4, R5 and R6, and the voltage across capacitor C1 is decreased. When capacitor C1 is nearly completely discharged, which occurs at the time $t3$ in FIGURE 2, the multivibrator can oscillate again, and the cycle of operation described above is repeated.

The frequency of the multivibrator oscillations is determined substantially by the time constants of the charge and discharge circuits for capacitors C2 and C3. The duration of each wave train interval $t1$–$t2$ or $t3$–$t4$ in FIGURE 2 is dependent on the ratio of the capacity of capacitor C1 to the capacity of capacitors C2 and C3. The capacity of capacitor C1 is considerably larger than the capacity of each of capacitors C2 and C3. The interval $t2$–$t3$ in FIGURE 2 between two successive wave trains is dependent on the time constants of the discharge circuits of capacitor C1.

In the illustrated signal generator the wave form of the oscillations becomes trapezoidal or saw-tooth-shaped.

In the shown embodiment the oscillations produced by the multivibrator are taken from a voltage divider consisting of resistors R5 and R6 and are applied to the amplifying transistor TR3. As shown in the figure the resistor R6 is connected to point $c$, and thus a voltage being the sum of the direct voltage across capacitor C1 and the alternating voltage across resistor R6 will be present between the base and emitter of transistor TR3. Thus, the base of transistor TR2 also obtains bias from capacitor C1, and when this bias has increased sufficiently in a positive sense, transistor TR3 is also blocked. Due to the voltage division in resistors R5–R6 the base drive voltage for transistor TR3 becomes less than the base drive voltage for transistors TR1 and TR2. When the direct voltage across capacitor C1 increases, transistor TR3 will therefore be blocked earlier than transistors TR1 and TR2, i.e. transistor TR3 is blocked before the multivibrator has ceased to oscillate, and only a part of each wave train is passed by transistor TR3. The duration of the parts of each wave train that is passed by transistor TR3 depends on the ratio between the resistances of resistors R5 and R6.

The component of the illustrated signal generator may have the following parameters:

| | | |
|---|---|---|
| Transistors TR1, TR2 and TR3 | | Type OC71 |
| Diodes D1 and D2 | | Type OA70 |
| R1 | ohms | 3300 |
| R2 | do | 100,000 |
| R3 | do | 100,000 |
| R4 | do | 3300 |
| R5 | megohms | 1 |
| R6 | ohms | 100,000 |
| R7 | do | 4700 |
| C1 | microfarads | 32 |
| C2 | do | 0.04 |
| C3 | do | 0.04 |

These data are given by way of example only and may vary considerably within the scope of the invention.

The illustrated transistors are of the p-n-p-type, but of course transistors of the n-p-n-type may also be used.

The wave pulse generator according to the invention may also be equipped with electron tubes instead of transistors. The modifications of the circuit conditioned by the use of electron tubes will easily be realized by a person skilled in the art.

What I claim is:

1. A device for generating repeated trains of pulses comprising a self-blocking multivibrator circuit having two amplifier elements operating in phase opposition, and a direct current source for supplying the necessary operating power to the multivibrator circuit, each of said amplifier elements having at least three electrodes including a first electrode, a second electrode serving as control electrode and a third electrode, said first electrodes being connected through a resistance means to a first pole of said direct current source, said third electrodes being connected to a second pole of said direct current source, said control electrode of each amplifier element being connected via capacitive means with the first electrode of the other amplifier element, said control electrodes of both amplifier elements being also connected to a common point via circuits each comprising a resistor and an asymmetric conducting element connected in parallel with the resistor, said asymmetric conducting elements being so poled as to provide a low resistance path for discharge current from said capacitive means, and a further capacitor connected between said common point and said second pole of the direct current source.

2. The device as claimed in claim 1 comprising an amplifier for the amplification of the oscillations produced by the multivibrator circuit, and means connecting said amplifier to an output of said multivibrator circuit comprising a voltage divider connected between said common point and a second point in the multivibrator circuit, the said second point being so located that the alternating voltage produced by the multivibrator circuit will be present across said voltage divider, and means connecting the input of the amplifier betwen a tap on the voltage divider and a pole of the direct current source, whereby the amplifier acts as a gate which passes only part that is less than all of each wave train produced by the multivibrator circuit.

3. A device for generating repeated trains of electric pulses comprising a multivibrator circuit including two transistors, each transistor having collector, base and emitter electrodes, and first and second terminals connecting the multivibrator circuit to a direct current source for supplying the required operating power to the multivibrator circuit, the base electrodes of both transistors being connected to a common point by means of circuits each comprising a resistor and an asymmetric conducting element connected in parallel with the resistor, the asymmetric elements having their forward direction from the base electrodes to the said common point, capacitive means being connected between said common point and said first terminal, the base electrode of each transistor being connected to the collector electrode of the other transistor over a capacitor, and the collector electrode of each transistor being connected to said second terminal through circuit means including a resistor, and the emitter electrode of each transistor being connected to said first terminal.

4. A wave pulse generator as claimed in claim 3, in which a transistor amplifier is connected to said multivibrator circuit, said transistor amplifier having a base drive circuit connected betwen said first terminal and a tap on a voltage divider which is connected between said common point and a second point in the multivibrator circuit, said second point being so located that the alternating voltage produced by the multivibrator circuit will be present across said voltage divider.

References Cited by the Examiner

UNITED STATES PATENTS

| | | | |
|---|---|---|---|
| 2,633,535 | 3/53 | Daskan | 331—144 |
| 2,737,587 | 3/56 | Trousdale | 331—113 |
| 2,906,964 | 9/59 | Davidoff | 331—144 |
| 2,997,665 | 8/61 | Sylvan | 307—88.5 |

FOREIGN PATENTS

| | | |
|---|---|---|
| 123,215 | 12/46 | Australia. |

ROY LAKE, *Primary Examiner.*

HERMAN KARL SAALBACH, *Examiner.*